(12) United States Patent
Tsujita

(10) Patent No.: US 11,987,079 B2
(45) Date of Patent: May 21, 2024

(54) TRANSMITTER, RECEIVER, AND TRANSMISSION-RECEPTION SYSTEM

(71) Applicant: PACIFIC INDUSTRIAL CO., LTD., Gifu-ken (JP)

(72) Inventor: Yasuhisa Tsujita, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 279 days.

(21) Appl. No.: 17/311,782

(22) PCT Filed: Aug. 29, 2019

(86) PCT No.: PCT/JP2019/033899
§ 371 (c)(1),
(2) Date: Jun. 8, 2021

(87) PCT Pub. No.: WO2021/038792
PCT Pub. Date: Mar. 4, 2021

(65) Prior Publication Data
US 2022/0176755 A1 Jun. 9, 2022

(51) Int. Cl.
*B60C 23/04* (2006.01)
*G07C 5/02* (2006.01)

(52) U.S. Cl.
CPC ...... *B60C 23/0415* (2013.01); *B60C 23/0488* (2013.01); *B60C 23/0494* (2013.01); *G07C 5/02* (2013.01)

(58) Field of Classification Search
CPC ............ B60C 23/0415; B60C 23/0488; B60C 23/0494; B60C 23/0486; B60C 23/04; B60C 23/0462; G07C 5/02

(Continued)

(56) References Cited

U.S. PATENT DOCUMENTS

| 7,019,630 B2 * | 3/2006 | Katou | ................ B60C 23/0416 340/447 |
| 7,212,105 B2 * | 5/2007 | Okubo | ............... B60C 23/0408 340/447 |
| 2015/0336433 A1 | 11/2015 | Naruse | |

FOREIGN PATENT DOCUMENTS

| EP | 1464518 A2 | 10/2004 |
| GB | 2547937 A | 9/2017 |

(Continued)

OTHER PUBLICATIONS

International Search Report for Application No. PCT/JP2019/033899 dated Oct. 8, 2019, 4 pages.

(Continued)

*Primary Examiner* — Eric Blount
(74) *Attorney, Agent, or Firm* — CANTOR COLBURN LLP

(57) ABSTRACT

A transmitter is configured to be integrated with a tire valve attached to a wheel. The transmitter includes a data generating unit, a transmitting unit, and a controlling unit. The data generating unit is configured to generate transmission data. The transmitting unit is configured to transmit the transmission data to a receiver that includes a setting unit that sets a threshold related to control of a vehicle in accordance with a type of the wheel. The controlling unit causes the transmitting unit to transmit the transmission data. The transmission data includes wheel identification information. The wheel identification information is required by the setting unit when setting the threshold and allows the setting unit to recognize the type of the wheel to which the tire valve is attached.

8 Claims, 5 Drawing Sheets

(58) Field of Classification Search
USPC .......................................................... 340/442
See application file for complete search history.

(56) References Cited

FOREIGN PATENT DOCUMENTS

| JP | 8188020 A | 7/1996 |
|---|---|---|
| JP | 200615909 A | 1/2006 |
| JP | 2011255885 A | 12/2011 |
| JP | 2014091344 A | 5/2014 |
| JP | 2015223999 A | 12/2015 |
| JP | 2017149251 A | 8/2017 |
| WO | 2015076199 A1 | 5/2015 |
| WO | 2018114577 A1 | 6/2018 |

OTHER PUBLICATIONS

Supplementary European Search Report for Application No. 19943838 dated Oct. 8, 2021, 6 pages.

* cited by examiner

| Preamble | ID Code | Wheel Identification Information |
|---|---|---|

| Type of Wheel | Upper Limit of Vehicle Speed |
|---|---|
| Aluminum Wheel | First Vehicle Speed Threshold |
| Steel Wheel | Second Vehicle Speed Threshold |

TRANSMITTER, RECEIVER, AND TRANSMISSION-RECEPTION SYSTEM

TECHNICAL FIELD

The disclosure relates to a transmitter, a receiver, and a transmission-reception system.

BACKGROUND ART

A transmission-reception system has been known that includes a receiver and a transmitter configured to be attached to a tire valve. Such a transmission-reception system is disclosed, for example, in Patent Document 1. The transmitter includes a sensor, a data generating unit configured to generate transmission data, and a transmitting unit configured to transmit the transmission data. The transmitter is integrally provided, for example, in a tire valve attached to a wheel. The receiver receives the transmission data transmitted by the transmitter.

PRIOR ART DOCUMENT

Patent Document

Patent Document 1: Japanese Laid-Open Patent Publication No. 2014-91344

SUMMARY OF THE INVENTION

Problems that the Invention is to Solve

There has been a demand to properly control a vehicle by using a transmission-reception system.

It is an objective of the present disclosure to provide a transmitter, a receiver, and a transmission-reception system that are capable of properly controlling a vehicle.

Means for Solving the Problems

In accordance with a first aspect of the present disclosure, a transmitter configured to be integrated with a tire valve attached to a wheel is provided. The transmitter includes a data generating unit, a transmitting unit, and a controlling unit. The data generating unit is configured to generate transmission data. The transmitting unit is configured to transmit the transmission data to a receiver. The receiver includes a setting unit that sets a threshold related to control of a vehicle in accordance with a type of the wheel. The controlling unit is configured to cause the transmitting unit to transmit the transmission data. The transmission data includes wheel identification information. The wheel identification information is required by the setting unit when setting the threshold and allows the setting unit to recognize the type of the wheel to which the tire valve is attached.

With this configuration, the transmitter transmits the transmission data including the wheel identification information. The wheel identification information is configured to allow the setting unit of the receiver to recognize the type of the wheel. This allows the receiver to recognize the type of the wheel to which the transmitter is attached from the wheel identification information. Since the setting unit sets the threshold used in the control of the vehicle in accordance with the type of the wheel, the vehicle can be controlled properly in accordance with the type of the wheel.

The wheel may be selected as one of an aluminum wheel and a steel wheel. The transmitter further may include a metal member that is configured such that an inductance changes in accordance with the type of the wheel to which the transmitter is attached, an inductance measuring unit configured to measure the inductance of the metal member, and a determining unit configured to determine whether the wheel to which the transmitter is attached is the aluminum wheel or the steel wheel based on the inductance of the metal member measured by the inductance measuring unit.

Steel has a higher magnetic permeability than aluminum. The inductance of the metal member changes depending on whether the wheel is made of steel or aluminum. It is thus possible to determine the type of the wheel by measuring the inductance of the metal member.

The metal member may have a shape of a loop.

The transmitter may be arranged in the wheel such that a loop plane, which is an imaginary plane surrounded by the metal member, is orthogonal to a centrifugal direction of the wheel.

In accordance with a second aspect of the present disclosure, a transmitter configured to be integrated with a tire valve attached to a wheel is provided. The transmitter includes an acceleration sensor, a data generating unit, a transmitting unit, a determining unit, a warning transmission controlling unit, and a warning threshold setting unit. The acceleration sensor is configured to detect a centrifugal acceleration that acts on the transmitter as the wheel rotates. The data generating unit is configured to generate transmission data. The transmitting unit is configured to transmit the transmission data to a receiver. The determining unit is configured to determine a type of the wheel to which the transmitter is attached. The warning transmission controlling unit is configured to cause the transmitting unit to perform warning transmission for causing the receiver to issue a warning when a detection value of the acceleration sensor exceeds a threshold. The warning threshold setting unit is configured to set the threshold in accordance with the type of the wheel determined by the determining unit.

With this configuration, the warning threshold setting unit is capable of setting a threshold corresponding to the type of the wheel. When the detection value of the acceleration sensor exceeds the threshold, the warning transmission controlling unit causes the transmitting unit to perform the warning transmission. This allows the receiver to issue a warning. The receiver is allowed to issue a warning, which is one mode of the vehicle control, in accordance with the type of the wheel. The vehicle can thus be controlled properly in accordance with the type of the wheel.

In accordance with a third aspect of the present disclosure, a receiver is provided that is configured to receive transmission data transmitted from a transmitter integrated with a tire valve attached to a wheel. The receiver includes a receiving unit, a receiver memory unit, an obtaining unit, and a setting unit. The receiving unit is configured to receive the transmission data. The receiver memory unit is configured to store a correspondence relationship between a type of the wheel and a threshold related to control of a vehicle. The obtaining unit is configured to obtain wheel identification information from the transmission data received by the receiving unit. The setting unit is configured to recognize, from the wheel identification information, the type of the wheel to which the tire valve is attached, and to set, from the correspondence relationship, the threshold in accordance with the recognized type of the wheel.

With this configuration, since the setting unit of the receiver sets the threshold related to the control of the vehicle from the wheel identification information obtained from the transmission data, the vehicle can be controlled properly in accordance with the type of the wheel.

The threshold may include an upper limit of a vehicle speed of the vehicle.

The vehicle speed that can be handled can vary depending on the type of the wheel. Since the upper limit of the vehicle speed is set in accordance with the type of the wheel, control corresponding to the type of the wheel can be performed.

In accordance with a fourth aspect of the present disclosure, a transmission-reception system is provided that includes a transmitter configured to be integrated with a tire valve attached to a wheel, and a receiver configured to receive transmission data transmitted from the transmitter. The transmitter includes a data generating unit configured to generate the transmission data, a transmitting unit configured to transmit the transmission data, and a controlling unit configured to cause the transmitting unit to transmit the transmission data. The transmission data includes wheel identification information that indicates a type of the wheel to which the tire valve is attached. The receiver includes a receiving unit, a receiver memory unit, an obtaining unit, and a setting unit. The receiving unit is configured to receive the transmission data. The receiver memory unit is configured to store a correspondence relationship between the type of the wheel and a threshold related to control of a vehicle. The obtaining unit is configured to obtain the wheel identification information from the transmission data received by the receiving unit. The setting unit is configured to recognize, from the wheel identification information, the type of the wheel to which the tire valve is attached, and to set, from the correspondence relationship, the threshold in accordance with the recognized type of the wheel.

With this configuration, since the setting unit of the receiver sets the threshold related to the control of the vehicle based on the wheel identification information obtained from the transmission data, the vehicle can be controlled properly in accordance with the type of the wheel.

Effects of the Invention

The present disclosure is capable of allowing control of a vehicle to be properly performed.

MODES FOR CARRYING OUT THE INVENTION

First Embodiment

A transmitter, a receiver, and a transmission-reception system according to a first embodiment will now be described.

Figure 1:
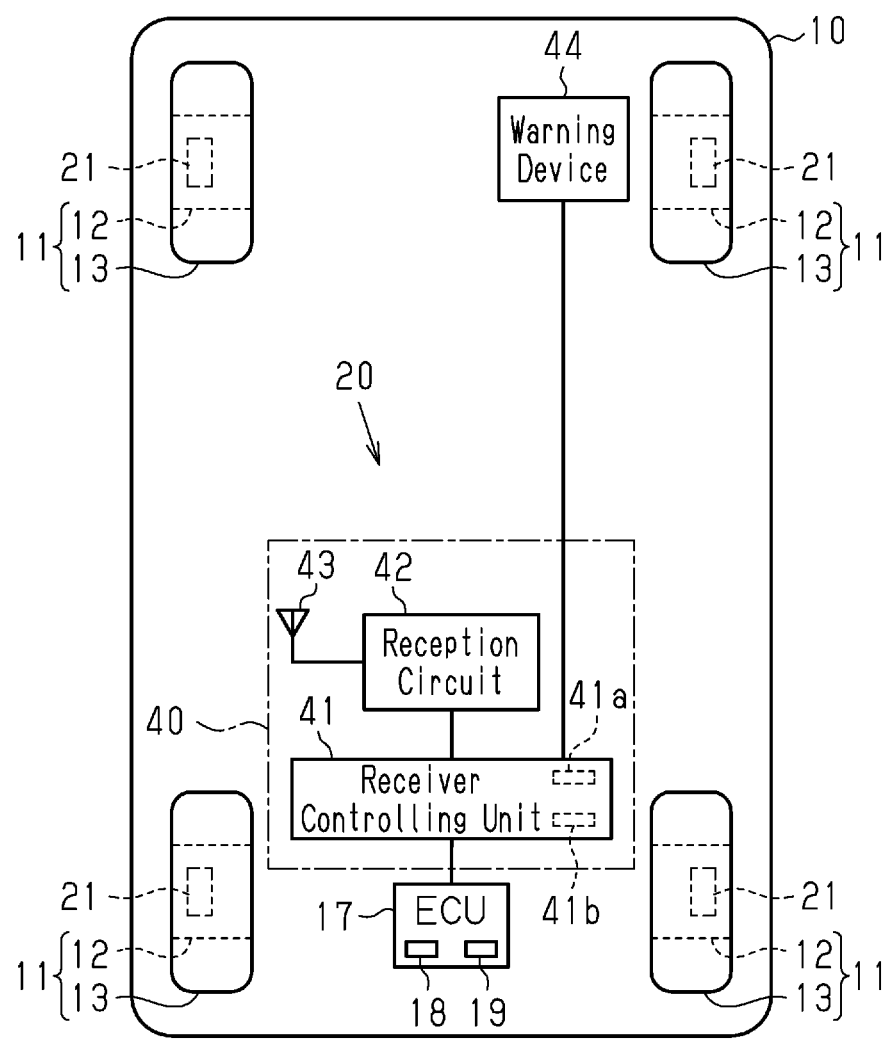
FIG. 1 is a schematic diagram of a vehicle and a transmission-reception system mounted on the vehicle.

As shown in FIG. 1, a vehicle 10 includes four wheel assemblies 11 and an ECU 17. The ECU 17 is an electronic control unit that includes a CPU 18 and a memory unit 19, which are hardware. The ECU 17 performs control such as control of traveling of the vehicle 10. The memory unit 19 stores various programs for controlling the vehicle 10. The CPU 18 executes various processes by referring to the memory unit 19. The CPU 18, which is processing circuitry, may include one or more processors that operate according to a computer program, one or more dedicated hardware circuits such as an ASIC, or a combination thereof. The memory unit 19 includes memory such as a RAM and a ROM. The memory stores program code or instructions configured to cause the CPU to execute processes. The memory, or computer readable medium, includes any type of medium that is accessible by general-purpose computers and dedicated computers.

The vehicle 10 has a transmission-reception system 20. The transmission-reception system 20 includes transmitters 21 and a receiver 40. Each transmitter 21 is configured to be installed in one of the four wheel assemblies 11 of the vehicle 10. The receiver 40 is configured to be installed in the vehicle 10.

Figure 2:
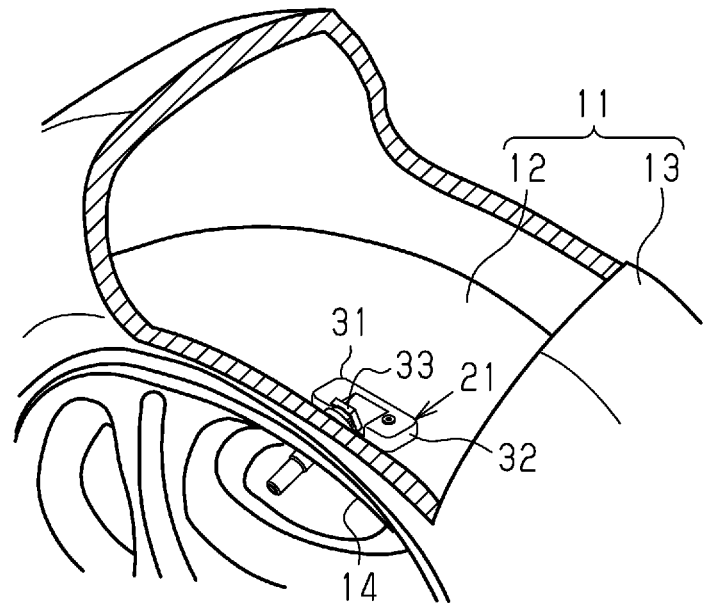
FIG. 2 is a perspective view of a transmitter attached to a wheel.
Figure 3:
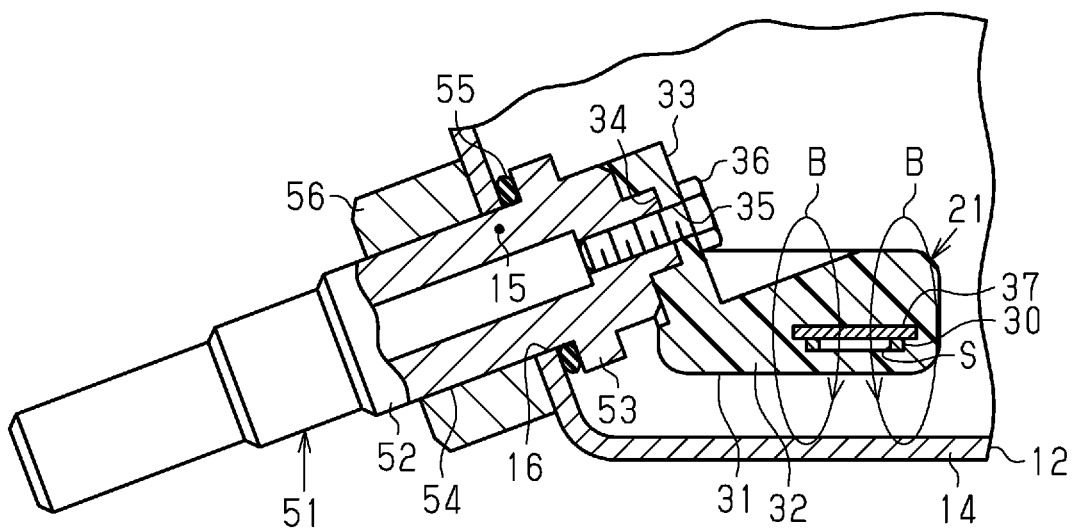
FIG. 3 is a partially cut-away diagram showing a clamp-in valve and a transmitter attached to the clamp-in valve.

As shown in FIGS. 2 and 3, the wheel assembly 11 includes a wheel 12 and a tire 13 mounted on the wheel 12. The wheel 12 includes a rim 14. The rim 14 has a mounting hole 15 extending through the rim 14. The inner circumferential surface of the mounting hole 15 is a mounting hole forming surface 16. The transmitter 21 is configured to be attached to the tire valve installed in the rim 14 of the wheel 12 to be integrated with the tire valve. The transmitter 21 is thus installed in the wheel assembly 11. The transmitter 21 is attached to the wheel 12, on which the tire 13 is mounted, such that the transmitter 21 is arranged inside the tire 13. The transmitter 21 detects the condition of the corresponding tire 13, for example, the air pressure and internal temperature of the tire 13, and wirelessly transmits a data signal including the detection results to the receiver 40. The transmission-reception system 20 is configured to monitor the condition of the tire 13 by receiving the data signal transmitted from the transmitter 21 at the receiver 40.

The transmitter 21 is configured to be attachable to multiple types of tire valves. In the present embodiment, the transmitter 21 is attachable to selected one of two types of valves: a clamp-in valve 51 and a snap-in valve 61.

The transmitter 21 includes a case 31. The case 31 includes a case body 32, which accommodates components of the transmitter 21, and an attachment wall 33, to which a tire valve is attached. The attachment wall 33 includes an insertion portion 34, into which a tire valve is inserted, and an insertion hole 35, into which a screw 36 for attaching the tire valve to the case 31 is inserted. The insertion portion 34 is a part of the attachment wall 33 that is recessed in the thickness direction of the attachment wall 33. The insertion hole 35 extends through the attachment wall 33 in the thickness direction of the attachment wall 33. The insertion hole 35 opens to the insertion portion 34.

The clamp-in valve 51 includes a tubular valve stem 52. The valve stem 52 is made of metal. The valve stem 52 includes a flange 53 and a fastening portion 54. The flange 53 and the fastening portion 54 are spaced apart from each other in the axial direction of the valve stem 52. The flange 53 is a part of the valve stem 52 that is locally enlarged in the radial direction. The fastening portion 54 is a part of the valve stem 52 that has a threaded outer circumferential surface. That is, the fastening portion 54 is an external thread. When the clamp-in valve 51 is installed in the wheel 12, the flange 53 is located inside the tire 13, and the fastening portion 54 is located outside the tire 13. The clamp-in valve 51 is installed in the wheel 12 with a grommet 55 disposed between the wheel 12 and the flange 53. A nut 56 is mounted on the fastening portion 54. The nut 56 and the flange 53 hold the wheel 12 and the grommet 55 in between to ensure the sealing property of the mounting hole 15. When the clamp-in valve 51 is used as the tire valve, the valve stem 52 faces a mounting hole forming surface 16. When the transmitter 21 is attached to the clamp-in valve 51, a part of the valve stem 52 is inserted into the insertion portion 34. Then, the screw 36, which is inserted into the insertion hole 35, is fastened to the valve stem 52, so that the transmitter 21 is attached to the clamp-in valve 51.

Figure 4:
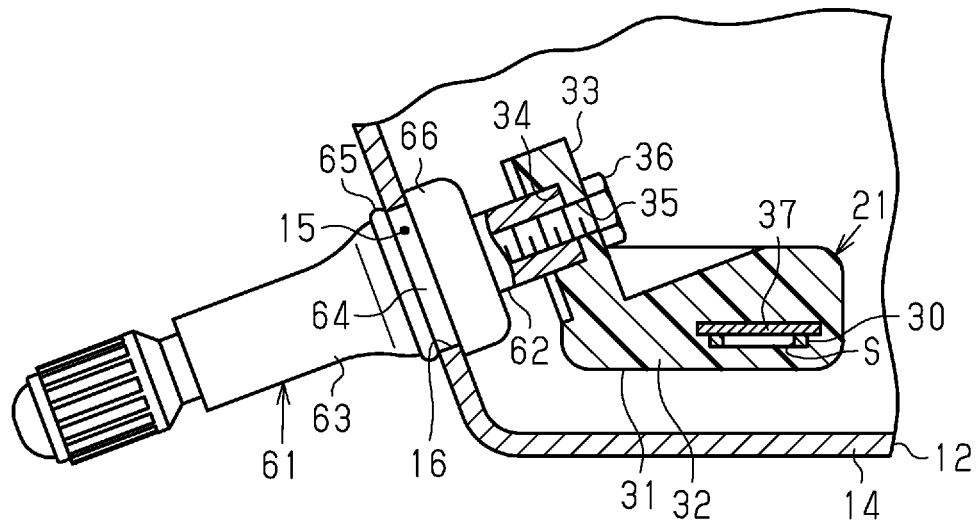
FIG. 4 is a partially cut-away diagram showing a snap-in valve and a transmitter attached to the snap-in valve.

As shown in FIG. 4, the snap-in valve 61 includes a tubular valve stem 62 and a cylindrical body 63, which is disposed on the outer circumference of the valve stem 62. The valve stem 62 is made of metal, and the body 63 is made of rubber. The opposite ends of the valve stem 62 protrudes from the body 63. The body 63 includes a mount portion 64. The body 63 also includes a first holding portion 65 and a second holding portion 66, which are provided on opposite sides of the mount portion 64. The mount portion 64 is a part of the body 63 that is recessed in the radial direction and disposed over the entire circumference of the body 63. The diameter of the first holding portion 65 and the diameter of the second holding portion 66 are greater than the diameter of the mount portion 64. The snap-in valve 61 is installed in the wheel 12 by press-fitting the body 63 into the mounting hole 15. The first holding portion 65 and the second holding portion 66 hold the wheel 12 in between, and the mount portion 64 closely contacts the mounting hole forming surface 16. The body 63 of the snap-in valve 61 ensures the sealing property of the mounting hole 15. When the transmitter 21 is attached to the snap-in valve 61, a part of the valve stem 62 is inserted into the insertion portion 34. Then, the screw 36, which is inserted into the insertion hole 35, is fastened to the valve stem 62, so that the transmitter 21 is attached to the snap-in valve 61.

Figure 5:
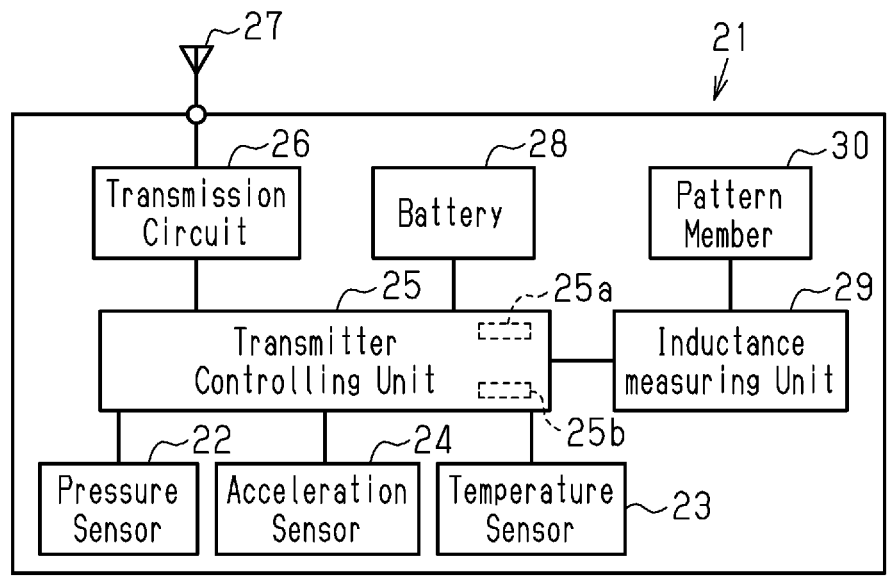
FIG. 5 is a schematic diagram showing the configuration of the transmitter.

As shown in FIG. 5, the transmitter 21 includes a pressure sensor 22, a temperature sensor 23, an acceleration sensor 24, a transmitter controlling unit 25, a transmission circuit 26, a transmission antenna 27, a battery 28, an inductance measuring unit 29, and a pattern member 30. These components are accommodated in the case body 32. The interior of the case body 32 may be filled with plastic without gaps. That is, the case 31 may be molded so that the components of the transmitter 21 are embedded in the case body 32.

The pressure sensor 22 is configured to detect the pressure of the corresponding tire 13. The pressure sensor 22 outputs the detection result to the transmitter controlling unit 25. The temperature sensor 23 is configured to detect the temperature of the corresponding tire 13. The temperature sensor 23 outputs the detection result to the transmitter controlling unit 25.

The acceleration sensor 24 is configured to rotate integrally with the wheel 12 to detect the centrifugal acceleration acting on the transmitter 21. Specifically, the acceleration sensor 24 has a detection axis and detects acceleration that acts in the direction along the detection axis. The acceleration sensor 24 is disposed such that a force directed in the radial direction of the wheel 12 acts on the detection axis, so as to detect the centrifugal acceleration acting on the transmitter 21. The centrifugal acceleration acting on the transmitter 21 can be regarded as the centrifugal acceleration acting on the wheel 12. The acceleration sensor 24 outputs the detection result to the transmitter controlling unit 25.

The transmitter controlling unit 25 is composed of circuitry such as a microcomputer including a CPU 25a and a memory unit 25b such as a RAM and a ROM. An ID code, which is identification information unique to each transmitter 21, is registered in the memory unit 25b. The memory unit 25b stores various programs for controlling the transmitter 21. The transmitter controlling unit 25 may include dedicated hardware that executes at least part of various processes, that is, an application specific integrated circuit (ASIC). The transmitter controlling unit 25, which is processing circuitry, may include one or more processors that operate according to a computer program, one or more dedicated hardware circuits such as an ASIC, or a combination thereof. The processor includes a CPU and memory such as a RAM, a ROM, and the like. The memory stores program code or instructions configured to cause the CPU to execute processes. The memory, or computer readable medium, includes any type of media that are accessible by general-purpose computers and dedicated computers.

The transmitter controlling unit 25 generates transmission data and outputs it to the transmission circuit 26. The transmission data includes, for example, pressure data and transmission data. The pressure data indicates the detection value of the pressure sensor 22. The temperature data indicates the detection value of the temperature sensor 23. The transmission circuit 26 modulates the transmission data from the transmitter controlling unit 25 to generate a data signal, and transmits the data signal through the transmission antenna 27. Accordingly, the transmission data is transmitted as the data signal. Any suitable modulation technique can be performed by the transmission circuit 26. The transmitter controlling unit 25 is a data generating unit configured to generate the transmission data. The transmission circuit 26 is a transmitting unit that is configured to transmit the transmission data as the data signal. The data signal is transmitted at a predetermined interval. For example, a signal of a frequency in a radiofrequency band is used as the data signal.

The inductance measuring unit 29 measures the inductance of the pattern member 30. The inductance measuring unit 29 outputs the detection result to the transmitter controlling unit 25.

Figure 6:
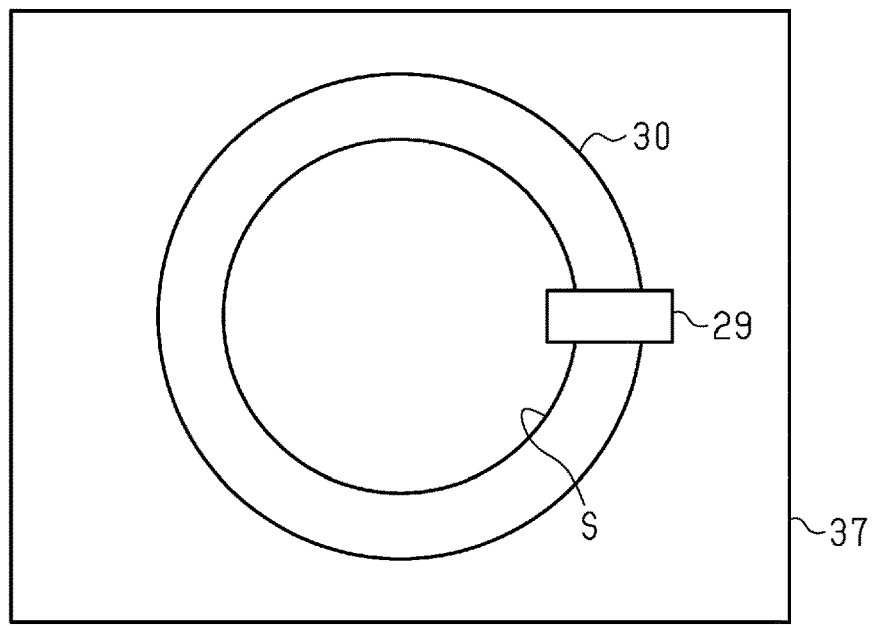
FIG. 6 is a plan view schematically showing a pattern member provided on a substrate.

As shown in FIG. 6, the pattern member 30 is provided in a substrate 37. Although not illustrated, the above-described components such as the transmitter controlling unit 25 and the pressure sensor 22 are mounted on the substrate 37. For purposes of illustration, the pattern member 30 is illustrated in an exaggerated manner.

The pattern member 30 is a loop-shaped metal member. The pattern member 30 is made of, for example, copper or aluminum. The pattern member 30 is connected to the inductance measuring unit 29. The pattern member 30 of the present embodiment is an inductance measuring pattern member that is provided to measure inductance. The pattern member 30 is also used as a connecting member that connects components of the transmitter 21 to one another.

As shown in FIGS. 3 and 4, the pattern member 30 is provided on one of opposite surfaces of the substrate 37, and the transmitter 21 is arranged such that the surface of the substrate 37 on which the pattern member 30 is provided faces the rim 14 of the wheel 12. The transmitter 21 is arranged such that a loop plane S, which is an imaginary plane surrounded by the pattern member 30, is orthogonal to the centrifugal direction of the wheel 12. In other words, the transmitter 21 is arranged such that the central axis of the pattern member 30 extends in a centrifugal direction of the wheel 12. In this description, the term "orthogonal" includes slight displacements due to the mounting accuracy of the transmitter 21 and tolerances of the components.

As shown in FIG. 1, the receiver 40 includes a receiver controlling unit 41, a reception circuit 42, and a reception antenna 43. The reception circuit 42 demodulates the data signal that has been transmitted from each transmitter 21 and received via the reception antenna 43, and delivers the demodulated signal to the receiver controlling unit 41. The reception circuit 42 is a receiving unit that receives the transmission data. The receiver controlling unit 41 is connected to a warning device 44.

The receiver controlling unit 41 is composed of a microcomputer including a receiver CPU 41a and a receiver memory unit 41b such as a ROM and a RAM. The receiver controlling unit 41 may include dedicated hardware that executes at least part of various processes, that is, an application specific integrated circuit (ASIC). The receiver controlling unit 41, which is processing circuitry, may include one or more processors that operate according to a computer program, one or more dedicated hardware circuits such as an ASIC, or a combination thereof. The processor includes a CPU and memory such as a RAM, a ROM, and the like. The memory stores program code or instructions configured to cause the CPU to execute processes. The memory, or computer readable medium, includes any type of media that are accessible by general-purpose computers and dedicated computers.

The receiver memory unit 41b stores the ID codes of the respective transmitters 21. The receiver controlling unit 41 verifies whether the ID code included in the transmission data matches the ID code stored in the receiver memory unit 41b. If the ID code included in the transmission data matches the ID code stored in the receiver memory unit 41b, the receiver controlling unit 41 uses the pressure data and the temperature data included in the transmission data as data representing the condition of the tire 13.

The receiver controlling unit 41 acquires the condition of the tire 13 from the received transmission data. When there is an anomaly in the tire 13, the receiver controlling unit 41 performs notification by using the warning device 44. The warning device 44 may be, for example, a device that notifies the user of an anomaly by sound, or illumination or blinking of light. Also, the receiver controlling unit 41 may display the condition of the tire 13 on the display device, which can be visually recognized by the occupants of the vehicle 10.

The transmission-reception system 20 of the present embodiment is configured to control the vehicle 10 in accordance with the type of the wheel 12. The process executed by the transmitter 21 and the receiver 40 will now be described. The process allows the vehicle 10 to be controlled in accordance with the type of the wheel 12.

Figure 7:
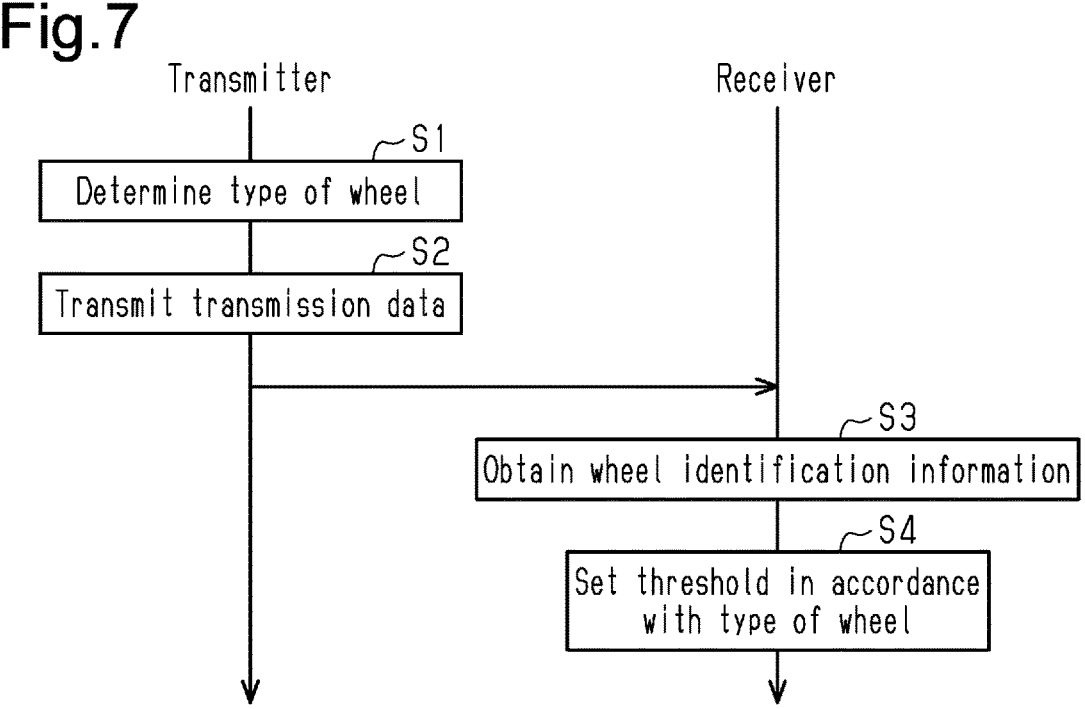
FIG. 7 is an interaction diagram of the transmitter and the receiver in the first embodiment.

As shown in FIG. 7, the transmitter controlling unit 25 determines the type of the wheel 12 to which the tire valve is attached in step S1. The types of the wheel 12 include an aluminum wheel and a steel wheel. An aluminum wheel is a wheel 12 made of aluminum. Aluminum incudes aluminum alloys. A steel wheel is a wheel 12 made of steel. The transmitter controlling unit 25 determines whether the wheel 12 is an aluminum wheel or a steel wheel.

The transmitter controlling unit 25 determines the type of the wheel 12 by using the measured value of the inductance measuring unit 29. When the inductance measuring unit 29 measures the inductance of the pattern member 30, an electric current is passed through the pattern member 30. The transmitter 21 may include a switch (not shown) so as to pass an electric current through the pattern member 30 only when measuring the inductance of the pattern member 30.

When an electric current is passed through the pattern member 30, magnetic flux B is generated as shown in FIG. 3. The magnetic flux B is generated in a manner penetrating the loop plane S. Since the magnetic flux B penetrates the wheel 12, an inductor is formed in which the pattern member 30 serves as wiring and the wheel 12 serves as a core. The inductance of the pattern member 30 increases as the magnetic permeability of the wheel 12, which serves as a core, increases. Steel is an alloy that has iron, which is a magnetic material, as a main component, and thus has a higher magnetic permeability than aluminum. Therefore, the inductance measured by the inductance measuring unit 29 varies between a case in which the wheel 12 is an aluminum wheel and a case in which the wheel 12 is a steel wheel. The transmitter controlling unit 25 determines that the wheel 12 is a steel wheel when the inductance measured by the inductance measuring unit 29 is greater than or equal to a predetermined determination threshold. On the other hand, the transmitter controlling unit 25 determines that the wheel 12 is an aluminum wheel when the inductance measured by the inductance measuring unit 29 is less than the predetermined determination threshold. The determination value is set to distinguish an aluminum wheel and a steel wheel from each other after calculating, through experiments and simulations, the inductance of the pattern member 30 in a case in which a steel wheel is used and the inductance of the pattern member 30 in a case in which an aluminum wheel is used. The transmitter controlling unit 25 executing the process of step S1 is a determining unit that determines the type of the wheel 12. The determination result of step S1 is stored, for example, in the RAM of the memory unit 25b.

Figures 8, 9, 10:
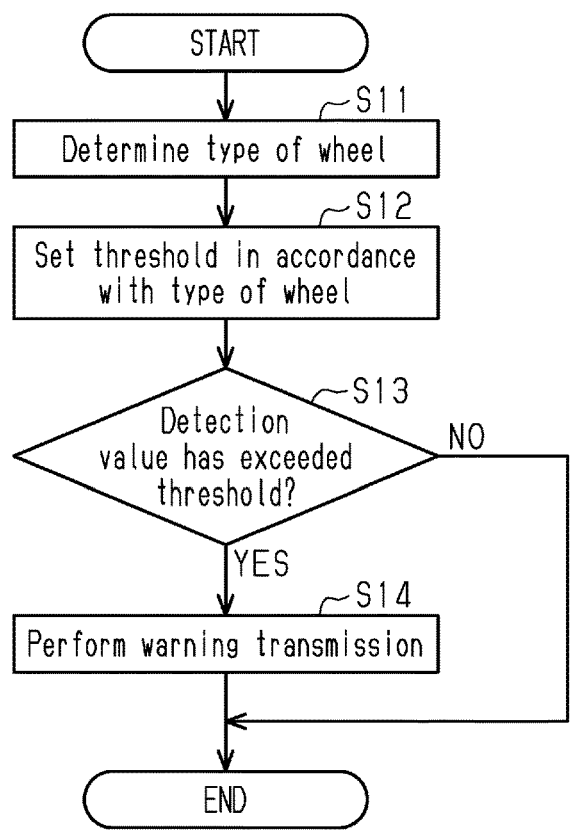
FIG. 8 is a diagram showing one example of transmission data.
FIG. 9 is a diagram showing a correspondence relationship between the types of wheel and thresholds related to control of the vehicle.
FIG. 10 is a flowchart showing a process executed by a transmitter controlling unit in a second embodiment.

As shown in FIG. 7, in step S2, the transmitter controlling unit 25 generates transmission data that includes wheel identification information. As shown in FIG. 8, the transmitter controlling unit 25 generates the transmission data that includes a preamble, an ID code, and wheel identification information. That is, the transmitter controlling unit 25 generates transmission data, which includes the wheel identification information, in addition to the pressure data and the temperature data. In the present embodiment, the wheel identification information indicates the type of the wheel 12. The wheel identification information is configured to cause the receiver controlling unit 41 to recognize the type of the wheel 12 to which a tire valve is attached. The wheel identification information is, for example, one-bit information. The value 0 of the wheel identification information indicates a steel wheel, and the value 1 of the wheel identification information indicates an aluminum wheel. The transmitter controlling unit 25 outputs the generated transmission data to the transmission circuit 26. The transmission circuit 26 transmits the data signal obtained by modulating the transmission data to the receiver 40. The transmitter controlling unit 25 executing the process of step S2 is a controlling unit that causes the transmission circuit 26 to transmit the transmission data.

When the receiver controlling unit 41 receives the transmission data in step S3 as shown in FIG. 7, the receiver controlling unit 41 obtains the wheel identification information included in the transmission data. The receiver controlling unit 41 executing the process of step S3 is an obtaining unit that obtains the wheel identification information.

Next, if the wheel identification information is 0 in step S4, the receiver controlling unit 41 recognizes that the tire valve is attached to a steel wheel. If the wheel identification information is 1, the receiver controlling unit 41 recognizes that the tire valve is attached to an aluminum wheel. The receiver controlling unit 41 sets a threshold in accordance with the type of the wheel 12. In the present embodiment, the receiver controlling unit 41 transmits the threshold corresponding to the type of the wheel 12, thereby setting a threshold used to control the ECU 17.

As shown in FIG. 9, the receiver memory unit 41b stores a correspondence relationship between the type of the wheel 12 and thresholds related to control of the vehicle 10. The threshold of the present embodiment is an upper limit of the vehicle speed. When the wheel 12 is a steel wheel, a first vehicle speed threshold is set. When the wheel 12 is an aluminum wheel, a second vehicle speed threshold is set. The upper limit of the vehicle speed is the threshold of the maximum speed allowed for the vehicle 10.

The first vehicle speed threshold is lower than the second vehicle speed threshold. Thus, the upper limit of the vehicle speed is set to be lower when a steel wheel is used as the wheel 12 than when an aluminum wheel is used as the wheel 12. A maximum speed is set for the tire 13. An aluminum wheel tends to mount a tire 13 of a high maximum speed as compared to a steel wheel. The reason for this is assumed to be the fact that if the diameter of the wheel 12 is the same, a steel wheel is heavier than an aluminum wheel. A tire 13 of a higher maximum speed has a lower aspect ratio. Accordingly, when a tire 13 of a higher maximum speed is used, while maintaining the outer diameter of the tire 13, the diameter of the wheel 12 is increased. In such a case, if a steel wheel is used, the wheel 12 is excessively heavy. It is thus assumed that an aluminum wheel is used for a tire 13 of a high maximum speed. In the present embodiment, the upper limit of the vehicle speed is set on the assumption that if the wheel 12 is an aluminum wheel, a tire 13 of a higher maximum speed is attached to the wheel 12 than in a case in which a steel wheel is used. The receiver controlling unit 41 executing the process of step S4 is a setting unit that sets a threshold related to control of the vehicle 10 in accordance with the type of the wheel 12.

The process from step S1 to step S4 may be executed when a predetermined condition is met, for example, when the standing time of the vehicle 10 reaches or exceeds a predetermined time. Alternatively, the process from step S1 to step S4 may be repeatedly executed while the vehicle 10 is traveling. The determination of whether the vehicle 10 is traveling and the detection of the standing time of the vehicle 10 can be performed by using, for example, the detection value of the acceleration sensor 24.

An operation of the first embodiment will now be described.

The transmitter 21 transmits transmission data including wheel identification information. Accordingly, a threshold that corresponds to the type of the wheel 12 is set in the ECU 17. The ECU 17 sets the upper limit of the vehicle speed in accordance with the type of the wheel 12. The ECU 17 controls the vehicle 10 such that the vehicle speed does not exceed the upper limit of the vehicle speed. The ECU 17 may perform control in which the upper limit of the vehicle speed is shown on the display device that is visually recognizable by the occupants. In this manner, the ECU 17 is capable of performing various types of control by using the upper limit of the vehicle speed. The upper limit of the vehicle speed is set to different values according to the type of the wheel 12. That is, the upper limit of the vehicle speed is set to a value suitable for the type of the wheel 12.

The first embodiment has the following advantages.

(1-1) The transmitter controlling unit 25 is capable of causing the receiver controlling unit 41 to recognize the type of the wheel 12 by transmitting transmission data including the wheel identification information. The receiver controlling unit 41 sets a threshold related to control of the vehicle 10 in accordance with the type of the wheel 12. The vehicle 10 can thus be controlled properly in accordance with the type of the wheel 12.

(1-2) Since steel has a higher magnetic permeability than aluminum, the inductance of the pattern member 30 varies depending on whether an aluminum wheel or a steel wheel is used as the wheel 12. The transmitter controlling unit 25 is capable of determining whether the wheel 12 is an aluminum wheel or a steel wheel based on the inductance of the pattern member 30. As such, wheel identification information does not have to be written in the memory unit 25b of the transmitter 21 in advance.

(1-3) The pattern member 30 has the shape of a loop. As compared to a case in which the pattern member 30 is a linear member, the magnetic flux B is easily guided to the wheel 12, so that the inductance of the pattern member 30 is easily changed.

(1-4) The loop plane S is orthogonal to the centrifugal direction of the wheel 12. The magnetic flux B generated in the pattern member 30 is more easily guided to the wheel 12, so that the inductance of the pattern member 30 is easily changed.

(1-5) The receiver controlling unit 41 recognizes the type of the wheel 12 from the wheel identification information obtained from the transmission data. The receiver controlling unit 41 is capable of setting a threshold corresponding to the type of the wheel 12 from the correspondence relationship between the recognized type of the wheel 12 and a threshold related to control of the vehicle 10. The vehicle 10 can thus be controlled properly in accordance with the type of the wheel 12.

(1-6) The receiver controlling unit 41 sets the upper limit of the vehicle speed to different values depending on whether the wheel 12 is a steel wheel or an aluminum wheel. The maximum speed of the tire 13 tends to vary depending on the type of the wheel 12 to which the tire 13 is attached. Thus, by setting the upper limit of the vehicle speed in accordance with the type of the wheel 12, control that corresponds to the type of the wheel 12 can be performed.

Second Embodiment

A transmitter 21 according to a second embodiment will now be described.

The transmitter of the second embodiment is different from that of the first embodiment in the process executed by the transmitter controlling unit. The hardware configuration of the transmitter and the receiver is similar to the first embodiment. The process executed in the transmitter will now be described.

As shown in FIG. 10, the transmitter controlling unit 25 determines the type of the wheel 12 in step S11. The determination of the type of the wheel 12 is the same as that of step S1 in the first embodiment. That is, determination is made as to whether the wheel 12 is a steel wheel or an aluminum wheel by using the inductance of the pattern member 30, which is measured by the inductance measuring unit 29. The transmitter controlling unit 25 determines the type of the wheel 12 by performing determination using the measured value of the inductance measuring unit 29. The transmitter controlling unit 25 executing the process of step S11 is a determining unit that is configured to determine the type of the wheel 12.

Subsequently, in step S12, the transmitter controlling unit 25 sets a threshold in accordance with the type of the wheel 12. As in the first embodiment, the upper limit of the vehicle speed is used as the threshold. When the wheel 12 is a steel wheel, the transmitter controlling unit 25 sets the threshold to the first vehicle speed threshold. When the wheel 12 is an aluminum wheel, the transmitter controlling unit 25 sets the threshold to a second vehicle speed threshold. The transmitter controlling unit 25 executing the process of step S12 is a warning threshold setting unit.

In the subsequent step S13, the transmitter controlling unit 25 determines whether the detection value of the acceleration sensor 24 has exceeded the threshold set in step S12. In a case in which the threshold is set to the first vehicle speed threshold in step S12, it is determined whether the detection value of the acceleration sensor 24 has exceeded the first vehicle speed threshold. In a case in which the threshold is set to the second vehicle speed threshold in step S12, it is determined whether the detection value of the acceleration sensor 24 has exceeded the second vehicle speed threshold. The determination of step S13 may be performed by using the detection value [G] of the acceleration sensor 24 or by using the vehicle speed [km/h] that has been calculated from the detection value of the acceleration sensor 24. When the determination of step S13 is performed by using the detection value [G] of the acceleration sensor 24, the first vehicle speed threshold and the second vehicle speed threshold are set as values of the acceleration [G]. When the determination of step S13 is performed by using the vehicle speed [km/h] calculated from the detection value of the acceleration sensor 24, the first vehicle speed threshold and the second vehicle speed threshold are set as values of the vehicle speed [km/h]. Since there is a correlation between the vehicle speed and the detection value of the acceleration sensor 24, the vehicle speed and the acceleration are interchangeable.

If the determination result of step S13 is negative, the transmitter controlling unit 25 ends the process. If the determination result of step S14 is affirmative, the transmitter controlling unit 25 executes the process of step S14.

In step S14, the transmitter controlling unit 25 causes the transmission circuit 26 to perform a warning transmission. The warning transmission refers to transmission of a signal requesting a warning to the occupants to the receiver 40. The signal includes, for example, a warning flag. The transmitter controlling unit 25 executing the process of step S14 is a warning transmission controlling unit.

The process of step S11 to step S14 is repeatedly executed at a predetermined control period. Alternatively, only the processes of step S13 and step S14 may be repeated after the threshold is set in the processes of step S11 and step S12. In this case, the processes of step S11 and step S12 may be executed again when a predetermined condition is met, for example, when the standing time of the vehicle 10 reaches or exceeds a predetermined time. The standing time of the vehicle 10 can be acquired by using, for example, the detection value of the acceleration sensor 24.

When receiving a signal transmitted from the transmitter 21 through the warning transmission, the receiver controlling unit 41 of the second embodiment issues a warning by using the warning device 44 or a display device visually recognizable by the occupants. That is, in the second embodiment, the receiver controlling unit 41 does not set the threshold corresponding to the type of the wheel 12.

The second embodiment has the following advantages.

(2-1) The transmitter controlling unit 25 sets the upper limit of the vehicle speed in accordance with the type of the wheel 12. When the detection value of the acceleration sensor 24 exceeds the upper limit of the vehicle speed, the transmitter controlling unit 25 causes the transmission circuit 26 to perform the warning transmission. The receiver 40 is allowed to issue a warning in accordance with the type of the wheel 12. The receiver 40 is allowed to issue a warning, which is one mode of the control of the vehicle 10, in accordance with the type of the wheel 12. The vehicle 10 can thus be controlled properly in accordance with the type of the wheel 12.

(2-2) The receiver controlling unit 41 is capable of issuing a warning in accordance with the type of the wheel 12 without setting the upper limit of the vehicle speed corresponding to the type of the wheel 12. Therefore, a warning can be issued in accordance with the type of the wheel 12, while simplifying the software of the receiver controlling unit 41.

The above-described embodiments may be modified as follows. The embodiments and the following modifications can be combined as long as the combined modifications remain technically consistent with each other.

In each of the embodiments, the memory unit 25b may store in advance wheel identification information corresponding to the type of the wheel 12 to which a tire valve is attached. The wheel identification information may be written in the memory unit 25b of the transmitter 21 when the transmitter 21 is produced or may be written in the memory unit 25b of the transmitter 21 using an external device such as a trigger device. In this case, the transmitter controlling unit 25 does not have to determine the type of the wheel 12 based on the detection value of the acceleration sensor 24. That is, the transmitter 21 does not have to include a determining unit. In this case, the transmitter 21 does not have to include the inductance measuring unit 29 and the pattern member 30.

In each of the embodiments, it suffices if the transmitter 21 includes at least one sensor that is capable of detecting at least one of the condition of the tire 13 and the condition of the road surface. That is, it suffices if the transmitter 21 includes at least one of the pressure sensor 22, which is capable of detecting pressure as the condition of the tire 13, the temperature sensor 23, which is capable of detecting the temperature as the condition of the tire 13, and the acceleration sensor 24, which is capable of detecting the centrifugal acceleration acting on the tire 13 as the condition of the tire 13. One example of the sensor that detects the condition of the road surface is the acceleration sensor 24. One examples of the condition of the road surface is the friction coefficient of the road surface during traveling. The friction coefficient of the road surface can be calculated by detecting the acceleration of the vehicle 10 in the traveling direction and the lateral acceleration using the acceleration sensor 24.

In each of the embodiments, there may be three or more types of the wheel 12. In addition to a steel wheel and an aluminum wheel, the types of the wheel 12 may include a magnesium wheel and a plastic wheel. Further, the types of the wheel 12 may include different types of wheel made of the same material, such as different types of steel wheels or different types of aluminum wheels. In this case, the threshold related to control of the vehicle 10 is associated with each type of the wheel 12.

In each of the embodiments, the control for causing the receiver controlling unit 41 to recognize the type of the wheel 12, which is, for example, determination of the type of the wheel 12 by the transmitter 21, or transmission of the transmission data including the wheel identification information, may be performed only when a specified condition is met. Likewise, the receiver controlling unit 41 may set the threshold corresponding to the type of the wheel 12 only when a specified condition is met. The specified condition may be a condition that the type of the tire valve is the snap-in valve 61. The maximum speed that can be handled by the snap-in valve 61 is lower than that of the clamp-in valve 51. Setting of the upper limit of the vehicle speed is thus important when the snap-in valve 61 is used as the tire valve. The specified condition may be a condition that the temperature is lower than a low temperature threshold or a condition that the temperature is higher than or equal to a high temperature threshold. The low temperature threshold is a threshold for detecting that the temperature is excessively low. The high temperature threshold is a threshold for detecting that the temperature is excessively high.

In each of the embodiments, the transmitter 21 may be attachable to a single type of tire valve. For example, the transmitter 21 may be configured to be attached only to the clamp-in valve 51. Further, the transmitter 21 may be configured to be attached only to the snap-in valve 61.

In each of the embodiments, the transmitter controlling unit 25 may perform determination using a method different from the method in the embodiments as long as the transmitter controlling unit 25 can determine whether the wheel 12 is a steel wheel or an aluminum wheel based on the inductance of the pattern member 30. For example, in a state in which the transmitter 21 is not attached to the wheel assembly 11, the transmitter controlling unit 25 measures the inductance of the pattern member 30 with the inductance measuring unit 29. The transmitter controlling unit 25 stores the measured inductance in the memory unit 25b. The inductance of the pattern member 30 that is measured in a state in which the transmitter 21 is not attached to the wheel assembly 11 has not been affected by the wheel 12. When determining the type of the wheel 12, the transmitter controlling unit 25 measures the inductance of the pattern member 30 with the inductance measuring unit 29, and compares the measured inductance with the inductance stored in the memory unit 25b. When the transmitter 21 is attached to the wheel assembly 11, the inductance of the pattern member 30 is affected by the wheel 12. If the measured inductance is higher than the inductance stored in the memory unit 25b by an amount greater than or equal to a threshold, the transmitter controlling unit 25 determines that the wheel 12 is a steel wheel. If the measured inductance is higher than the inductance stored in the memory unit 25b by an amount greater than or equal to a threshold, the transmitter controlling unit 25 determines that the wheel 12 is a steel wheel.

In each of the embodiments, the transmission antenna 27 may be used as the metal member. When a loop-shaped antenna is used as the transmission antenna 27, the transmission antenna 27 can also be used as the loop-shaped metal member.

In each of the embodiments, the loop plane S does not need to be orthogonal to the centrifugal direction of the wheel 12. That is, the pattern member 30 may be arranged in any manner as long as the inductance of the pattern member 30 can be changed by the wheel 12.

In each of the embodiments, the metal member does not necessarily need to have a shape of a loop. For example, the metal member may be a linear pattern member provided on the substrate 37.

In each of the embodiments, it suffices if the receiver controlling unit 41 sets a threshold for a device that is required to set a threshold corresponding to the type of the wheel 12. That is, not only the ECU 17, but also the receiver controlling unit 41, may set the threshold that is used by the receiver controlling unit 41.

In each of the embodiments, it suffices if the transmission data includes at least data for causing the receiver 40 to transmit the transmission data and the wheel identification information.

In each of the embodiments, the vehicle 10 may be a motorcycle or a vehicle having five or more wheel assemblies 11.

In the first embodiment, the ECU 17 may be regarded as a part of a receiver. That is, any type of receiver can be employed as long as it includes a device having a function of receiving transmission data and a device that sets a threshold for controlling the vehicle 10 in accordance with the type of the wheel 12. In this case, the memory unit 19 of the ECU 17 may store a correspondence relationship between the wheel identification information and the thresholds for controlling the vehicle 10. The receiver controlling unit 41 may obtain the wheel identification information and send it to the ECU 17, so that the ECU 17 sets the threshold for controlling the vehicle 10. In this case, the memory unit 19 of the ECU 17 is the receiver memory unit, and the ECU 17 is the setting unit.

In the first embodiment, the wheel identification information may be information of two or more bits.

In the first embodiment, the threshold related to control of the vehicle 10 may be any threshold other than the upper limit of the vehicle speed as long as the threshold is preferably changed in accordance with the type of the wheel 12. For example, the threshold may be a warning threshold for causing the receiver 40 issue a warning when the pressure of the tire 13 reaches or exceeds the threshold. The receiver controlling unit 41 sets a first warning threshold when the wheel 12 is a steel wheel, and the tire valve is the snap-in valve 61. On the other hand, the receiver controlling unit 41 sets a second warning threshold when the wheel 12 is an aluminum wheel, and the tire valve is the clamp-in valve 51. The first warning threshold is lower than the second warning threshold. The maximum pressure that can be handled by the snap-in valve 61 is lower than that of the clamp-in valve 51. A steel wheel tends to be thinner at the part to which the tire valve is attached than an aluminum wheel, so that load tends to locally concentrate on the tire valve. A section of the snap-in valve 61 that is in contact with the wheel 12 is the body 63, which is made of rubber. Thus, as compared to a case in which the snap-in valve 61 is attached to an aluminum wheel, the maximum pressure that can be handled tends to be lowered due to elastic deformation caused by concentration of load in a case in which the snap-in valve 61 is attached to a steel wheel.

The transmitter controlling unit 25 may include, in the transmission data, wheel identification information and valve identification information for allowing the receiver controlling unit 41 to recognize the type of the tire valve. In this case, the receiver memory unit 41b stores correspondence relationship between the warning threshold and the combination of the type of the tire valve and the type of the wheel 12. When the valve identification information is included in the transmission data, the memory unit 25b of the transmitter controlling unit 25 may store the type of the tire valve that is attached to the transmitter 21. Also, the transmitter controlling unit 25 may determine whether the tire valve to which the transmitter 21 is attached is the snap-in valve 61 or the clamp-in valve 51 based on the detection value of the acceleration sensor 24. The centrifugal acceleration acting on the transmitter 21 increases in proportion to the vehicle speed. The tire valve contacts the mounting hole forming surface 16 to be supported by the wheel 12. Accordingly, the section that is in contact with the mounting hole forming surface 16 serves as a support point onto which load is concentrated. When the tire valve is the clamp-in valve 51, the metal valve stem 52 faces the mounting hole forming surface 16. In contrast, when the tire valve is the snap-in valve 61, the rubber body 63 faces the mounting hole forming surface 16. Since the body 63 is more likely to be deformed than the valve stem 52, the snap-in valve 61 is tilted in the radial direction of the wheel 12 due to elastic deformation of the body 63. As a result, when the vehicle speed is increased, the transmitter 21 is tilted to shift outward in the radial direction of the wheel 12 as the distance from the snap-in valve 61 increases. Accordingly, the centrifugal acceleration detected by the acceleration sensor 24 is lower than the centrifugal acceleration acting on the transmitter 21. That is, when the vehicle speed is increased, the detection value of the acceleration sensor 24 is lower in the transmitter 21 attached to the snap-in valve 61 than in the transmitter 21 attached to the clamp-in valve 51. The transmitter controlling unit 25 calculates a predicted rotation period of the wheel 12 from the detection value of the acceleration sensor 24, and compares the rotation period with the period of the gravitational acceleration component included in the detection value of the acceleration sensor 24. If the difference between the predicted rotation period of the wheel 12 and the period of the gravitational acceleration component is in a permissible range, the transmitter controlling unit 25 determines that the tire valve is the clamp-in valve 51. If the difference is out of the permissible range, the transmitter controlling unit 25 determines that the tire valve is the snap-in valve 61. In this manner, the valve identification information can be included in the transmission data without storing the information of the tire valve in the memory unit 25b in advance.

If the transmitter 21 is used only for the snap-in valve 61, the transmitter controlling unit 25 does not need to include the valve identification information in the transmission data. In this case, it suffices if the receiver memory unit 41b stores correspondence relationship between the type of the wheel 12 and the warning threshold. Thus, even if the transmission data does not include the valve identification information, the receiver controlling unit 41 can set the first warning threshold when the wheel 12 is a steel wheel, and the tire valve is a snap-in valve.

When the threshold is set to a warning threshold, the receiver controlling unit 41 recognizes the pressure of the tire 13 from the pressure data included in the transmission data. When the pressure of the tire 13 exceeds the warning threshold, the receiver controlling unit 41 issues a warning using the warning device 44. Also, the receiver controlling unit 41 may recognize the pressure of the tire 13 from the pressure data included in the transmission data, and perform control in which a warning is shown on a display device that is visually recognizable by the occupants. In this manner, the receiver controlling unit 41 is capable of performing various types of control by using the warning threshold. Since the warning threshold is set to different values in correspondence with the type of the wheel 12, the warning threshold is set to a value suitable for the type of the wheel 12.

In the first embodiment, when the information indicating a steel wheel and the information indicating an aluminum wheel are both included in the wheel identification information included in the transmission data transmitted from each transmitter 21, the receiver controlling unit 41 may set the upper limit of the vehicle speed to the lowest value. That is, the receiver controlling unit 41 sets the upper limit of the vehicle speed to the first vehicle speed threshold, which corresponds to a steel wheel. When the wheel identification information includes information indicating a steel wheel and information indicating an aluminum wheel, the wheel assembly 11 may have been replaced by a wheel assembly with a spare tire. If the wheel assembly 11 attached to the vehicle 10 and the wheel assembly with a spare tire have different types of the wheel 12, the wheel identification information from the respective transmitters 21 includes information indicating different types of the wheels 12.

In the first embodiment, the wheel identification information may indicate an aluminum wheel when having a value of 0, and may indicate a steel wheel when having a value of 1.

In the first embodiment, the wheel identification information may be any type of information as long as it is capable of causing the receiver controlling unit 41 to recognize the type of the wheel 12. The wheel identification information may be information other than data that directly indicates the type of the wheel 12. For example, the wheel identification information may be the value of the ID code, or the transmission interval of the data signal, or the method of calculating an error correction code or an error detection code.

When the value of the ID code is used as the wheel identification information, the ID code may be represented as a hexadecimal number. In this case, a group of the ID codes in which the value of the most significant digit is 0 to 7 is associated with a steel wheel. A group of the ID codes in which the value of the most significant digit is 8 to F is associated with an aluminum wheel. An ID code corresponding to the type of the wheel 12 is registered in the transmitter 21 depending on the type of the wheel 12 to which the transmitter 21 is attached. The correspondence relationship between the groups of the ID codes and the types of the wheel 12 is stored in the receiver memory unit 41b. The receiver controlling unit 41 is capable of recognizing the type of the wheel 12 from the ID code included in the transmission data.

When the transmission interval of the data signal is used as the wheel identification information, the transmitter controlling unit 25 changes the transmission interval of the data signal in accordance with the type of the wheel 12. For example, the transmission interval of the data signal is made shorter when the wheel 12 to which the transmitter 21 is attached is a steel wheel than when the wheel 12 to which the transmitter 21 is attached is an aluminum wheel. The transmission interval of the data signal can be set using an external device such as a trigger device. The correspondence relationship between the transmission interval of the data signal and the types of the wheel 12 is stored in the receiver memory unit 41b. The receiver controlling unit 41 is capable of recognizing the type of the wheel 12 from the transmission interval of the transmission data.

When the method of calculating an error correction code or an error detection code is used as the wheel identification information, the transmitter controlling unit 25 changes the method of calculating the error correction code or the error detection code in accordance with the type of the wheel 12. For example, the data used in the calculation of the error correction code is made different between when the wheel 12 to which the transmitter 21 is attached is a steel wheel and when the wheel 12 to which the transmitter 21 is attached is an aluminum wheel. The correspondence relationship between the method of calculating the error correction code and the types of the wheel 12 is stored in the receiver memory unit 41b. The receiver controlling unit 41 calculates the error correction code using two calculation methods: the calculation method corresponding to a steel wheel and the calculation method corresponding to an aluminum wheel. The receiver controlling unit 41 selects one of the error correction codes, which have been calculated by the two calculation methods. Specifically, the receiver controlling unit 41 selects the error correction code that matches the error correction code included in the transmission data. The receiver controlling unit 41 recognizes, as the wheel 12 to which the transmitter 21 is attached, the type of the wheel 12 that corresponds to the calculation method that has calculated the selected error correction code. Although an error correction code is used in the above-described example, the same applies to an error detection code.

In the second embodiment, identification of the type of the wheel 12 in step S11 may be performed by storing the types of wheel 12 in the memory unit 25b in advance and referring to the memory unit 25b.

DESCRIPTION OF THE REFERENCE NUMERALS

10 . . . Vehicle; 12 . . . Wheel; 13 . . . Tire; 20 . . . Transmission-Reception System; 21 . . . Transmitter; 24 . . . Acceleration Sensor; 25 . . . Transmitter Controlling Unit, which is Data Generating Unit, Controlling Unit, Determining Unit, Identifying Unit, Warning Transmission Controlling Unit, and Warning Threshold Setting Unit; 26 . . . Transmission Circuit, which is Transmitting Unit; 40 . . . Receiver; 41 . . . Receiver Controlling Unit, which is Obtaining Unit and Setting Unit; 41b . . . Receiver Memory Unit; 42 . . . Reception Circuit, which is Receiving Unit; 51 . . . Clamp-In Valve, which is Tire Valve; 61 . . . Snap-In Valve, which is Tire Valve

The invention claimed is:

1. A transmitter configured to be integrated with a tire valve attached to a wheel, the transmitter comprising:
a data generating unit configured to generate transmission data;
a transmitting unit configured to transmit the transmission data to a receiver, the receiver including a setting unit that sets a threshold related to control of a vehicle in accordance with a type of the wheel; and
a controlling unit configured to cause the transmitting unit to transmit the transmission data, the transmission data including wheel identification information, wherein the wheel identification information is required by the setting unit when setting the threshold and allows the setting unit to recognize the type of the wheel to which the tire valve is attached.

2. The transmitter according to claim 1, wherein
the wheel is selected as one of an aluminum wheel and a steel wheel, and
the transmitter further comprises:
a metal member that is configured such that an inductance changes in accordance with the type of the wheel to which the transmitter is attached;
an inductance measuring unit configured to measure the inductance of the metal member; and
a determining unit configured to determine whether the wheel to which the transmitter is attached is the aluminum wheel or the steel wheel based on the inductance of the metal member measured by the inductance measuring unit.

3. The transmitter according to claim 2, wherein the metal member has a shape of a loop.

4. The transmitter according to claim 3, wherein the transmitter is arranged in the wheel such that a loop plane, which is an imaginary plane surrounded by the metal member, is orthogonal to a centrifugal direction of the wheel.

5. A transmitter configured to be integrated with a tire valve attached to a wheel, the transmitter comprising:
an acceleration sensor configured to detect a centrifugal acceleration that acts on the transmitter as the wheel rotates;
a data generating unit configured to generate transmission data;
a transmitting unit configured to transmit the transmission data to a receiver;
a determining unit configured to determine a type of the wheel to which the transmitter is attached;
a warning transmission controlling unit configured to cause the transmitting unit to perform warning transmission for causing the receiver to issue a warning when a detection value of the acceleration sensor exceeds a threshold; and
a warning threshold setting unit configured to set the threshold in accordance with the type of the wheel determined by the determining unit.

6. A receiver configured to receive transmission data transmitted from a transmitter integrated with a tire valve attached to a wheel, the receiver comprising:
a receiving unit configured to receive the transmission data;
a receiver memory unit configured to store a correspondence relationship between a type of the wheel and a threshold related to control of a vehicle;
an obtaining unit configured to obtain wheel identification information from the transmission data received by the receiving unit; and
a setting unit configured to recognize, from the wheel identification information, the type of the wheel to which the tire valve is attached, and to set, from the correspondence relationship, the threshold in accordance with the recognized type of the wheel.

7. The receiver according to claim 6, wherein the threshold includes an upper limit of a vehicle speed of the vehicle.

8. A transmission-reception system comprising:
a transmitter configured to be integrated with a tire valve attached to a wheel; and
a receiver configured to receive transmission data transmitted from the transmitter, wherein
the transmitter includes
a data generating unit configured to generate the transmission data, a transmitting unit configured to transmit the transmission data, and a controlling unit configured to cause the transmitting unit to transmit the transmission data, the transmission data including wheel identification information that indicates a type of the wheel to which the tire valve is attached, and the receiver includes a receiving unit configured to receive the transmission data, a receiver memory unit configured to store a correspondence relationship between the type of the wheel and a threshold related to control of a vehicle, an obtaining unit configured to obtain the wheel identification information from the transmission data received by the receiving unit, and a setting unit configured to recognize, from the wheel identification information, the type of the wheel to which the tire valve is attached, and to set, from the correspondence relationship, the threshold in accordance with the recognized type of the wheel.

* * * * *